United States Patent
Langhans

[11] Patent Number: 6,129,201
[45] Date of Patent: Oct. 10, 2000

[54] CURVED ELEMENT FOR MAGNETIC CHAIN CONVEYOR AND A CONVEYOR COMPRISING SAID ELEMENT

[75] Inventor: Gerhard Langhans, Wiesloch, Germany

[73] Assignee: System Plast S.n.c. di Marsetti & C. Stampaggio Technopolimeri, Italy

[21] Appl. No.: 09/191,822

[22] Filed: Nov. 13, 1998

[30] Foreign Application Priority Data

Nov. 14, 1997 [IT] Italy .................................. MI97A2539

[51] Int. Cl.⁷ .................................................. B65G 15/60
[52] U.S. Cl. .................................................... 198/805
[58] Field of Search ............................................. 198/805

[56] References Cited

U.S. PATENT DOCUMENTS

| 4,643,298 | 2/1987 | Wallaart | 198/805 |
|---|---|---|---|
| 5,027,942 | 7/1991 | Wallaart | 198/805 |
| 5,036,969 | 8/1991 | Garbagnati | 198/805 |
| 5,165,527 | 11/1992 | Garbagnati | 198/805 |
| 5,199,551 | 4/1993 | Wallaart | 198/805 |
| 5,890,583 | 4/1999 | Garbagnati | 198/805 |

FOREIGN PATENT DOCUMENTS

| 0207577 | 4/1989 | European Pat. Off. | B65G 21/20 |
|---|---|---|---|
| 0325333 | 7/1989 | European Pat. Off. | B65G 21/20 |
| 0366170 | 5/1990 | European Pat. Off. | B65G 21/22 |
| 0509605 | 1/1995 | European Pat. Off. | B65G 21/20 |
| 0286173 | 7/1995 | European Pat. Off. | B65G 21/20 |
| 0790197 | 8/1997 | European Pat. Off. | B65G 21/00 |
| 8901563 | 8/1989 | Germany | B65G 21/20 |

*Primary Examiner*—James R. Bidwell
*Attorney, Agent, or Firm*—Steinberg & Raskin, P.C.

[57] ABSTRACT

A curved element for a magnetic conveyer having a chain movable along a guide. The curved element including a first piece on which the chain moves, a second piece, and a separate third piece for housing the magnets.

23 Claims, 7 Drawing Sheets

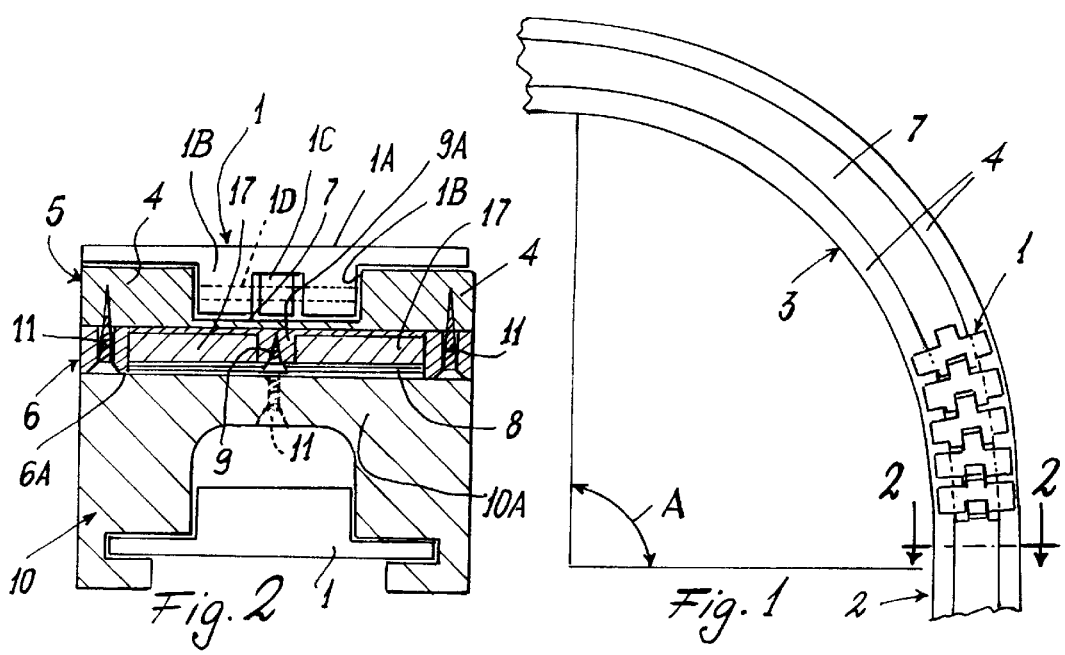
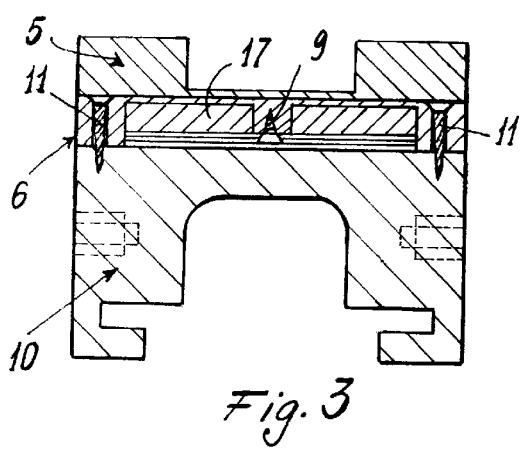
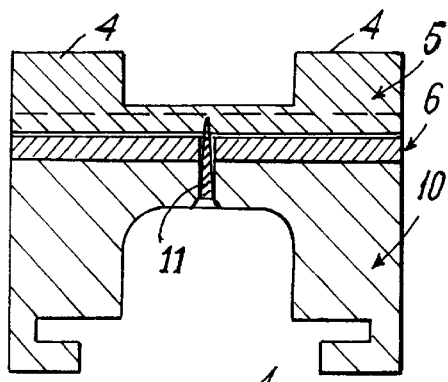
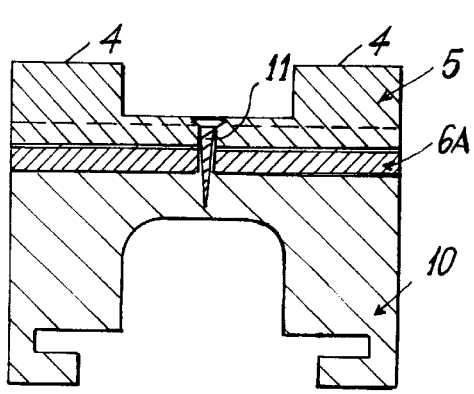
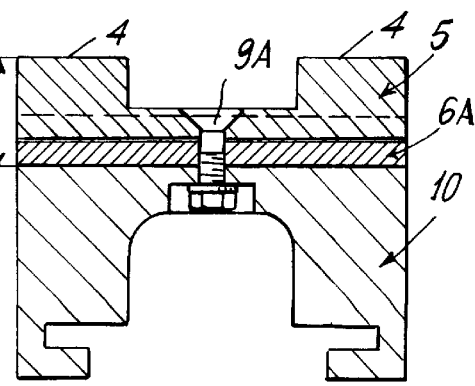
Fig. 1  Fig. 2  Fig. 3  Fig. 4  Fig. 5  Fig. 6

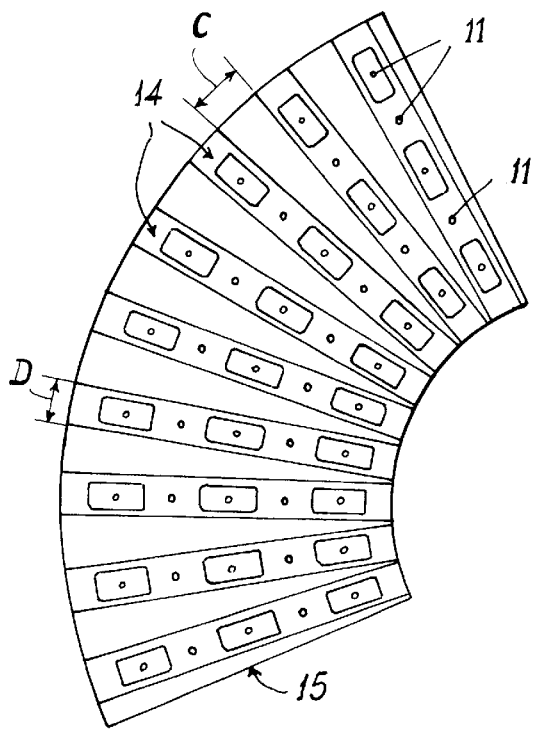
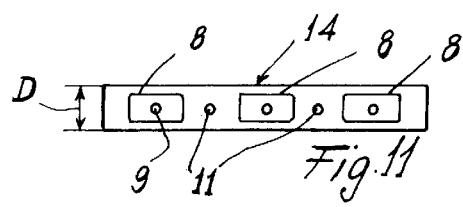
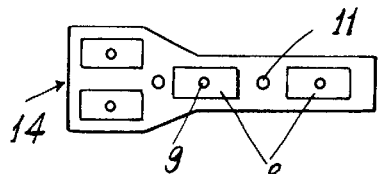
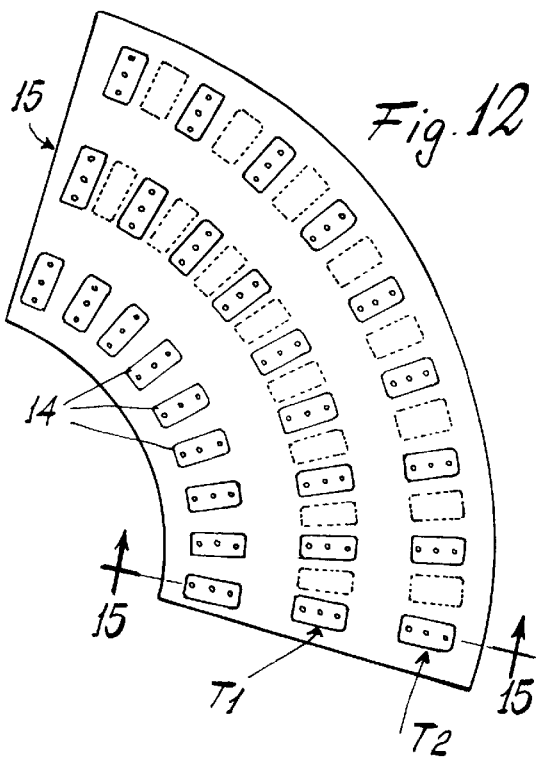
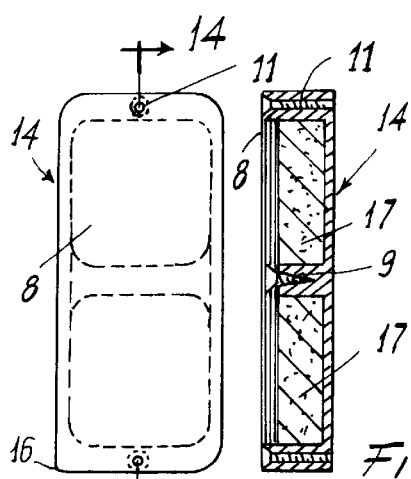
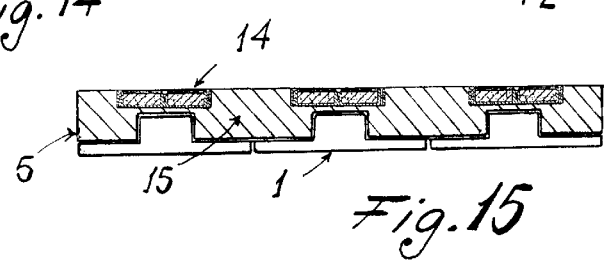

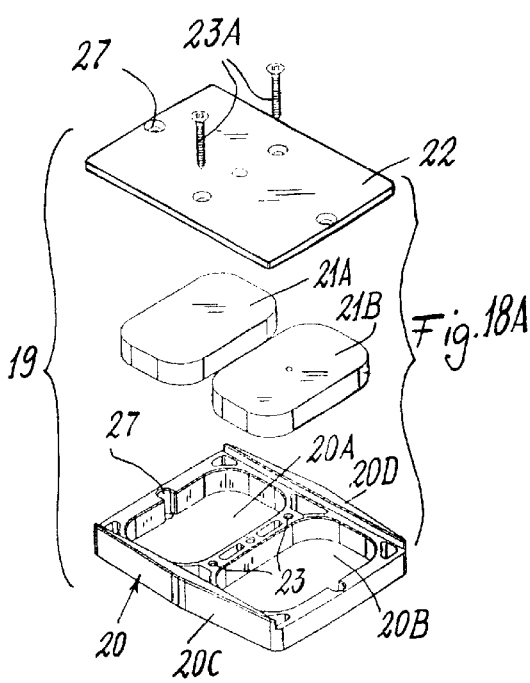
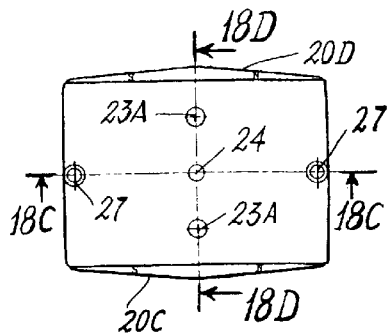
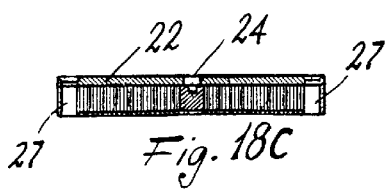
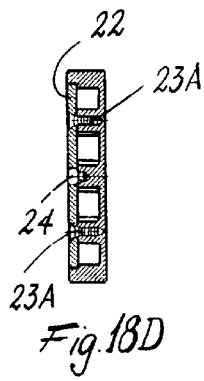
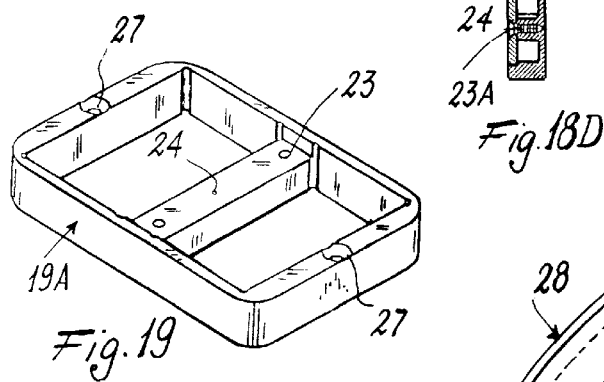
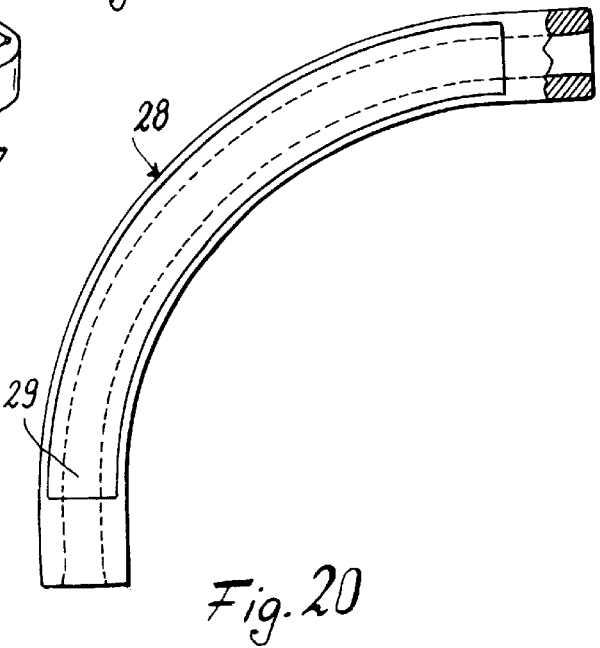
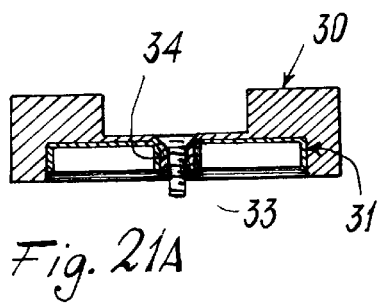

6,129,201

CURVED ELEMENT FOR MAGNETIC CHAIN CONVEYOR AND A CONVEYOR COMPRISING SAID ELEMENT

FIELD OF THE INVENTION

This invention relates to a curved element for a magnetic chain conveyor and a magnetic chain conveyor comprising said curved element, in accordance with the precharacterising part of the main claims.

BACKGROUND OF THE INVENTION

Magnetic chain conveyors comprising curved portions have been known for many years (see for example EP0286173 and EP0509605), the curved portions of said conveyors being generally formed in one piece and comprising cavities closed by covers in which the magnets are housed.

Alternatively, it is also known to form said curved elements by incorporating the magnets or magnetic material into their interior (see for example EP0336170).

The chains travel along the conveyor curved elements incorporating the magnets, resulting in deterioration of the slide surface of these elements with time. This problem is overcome by completely replacing the curved element, ie both the part along which the chains travel and the part housing the magnets. For reasons of simplicity and to reduce maintenance times, the deteriorated elements are generally replaced by new elements already incorporating the magnets. In this respect, the operations involved in removing the magnets from the deteriorated curved elements and inserting them into the new curved elements, should this be possible, woudl be relatively lengthy and difficult. However this maintenance procedure negatively affects maintenance costs, as the magnets represent a substantial part of the total element cost.

Embodiments are known (see EP0207577) in which the curved element is formed from several separate parts. These embodiments comprise a plurality of first separate parts on which the chain travels and a plurality of second separate parts in which the magnets are housed. Even with such elements, when the plurality of first parts on which the chain travels become worn the curved elements are completely replaced. In this respect, to replace only the parts on which the chain travels, the entire element consisting of as many as fourteen parts would have to be dismantled, this operation being relatively lengthy and difficult.

It is also known to construct at least that part of the conveyor which comes into contact with the chain from a high molecular weight polyethylene, for which it has been considered so far to use polyethylenes having a molecular weight of up to about 6 million g/molecule. To further improve the sliding resistance of the elements, ceramic additives have been introduced into the polyethylene. These mixtures have however proved difficult to work compared with those containing only polyethylene.

Furthermore, in conveyors comprising several side-by-side curved elements, or in conveyors comprising several side-by-side chains, for reasons of modularity it has been considered to use the same number of magnets for the more outer curved elements, ie those of greater radius, as for the more inner elements. It has however been found experimentally that particularly at high speeds it can happen that the more outer chains do not always remain adhering to the relative rails.

OBJECTS AND SUMMARY OF THE INVENTION

An object of this invention is to provide a curved element for a magnetic chain conveyor and a conveyor comprising this element, in which that part along which the chain travels can be replaced when deteriorated without having to remove and/or replace the relative magnets individually.

A further object is to provide a curved element and a relative conveyor which although constructable by mechanical machining as easily as the current elements constructed only of polyethylene; it offers excellent adherence and noise level on chain passage.

A further object is to provide a curved element and a relative conveyor which even in the case of several parallel chains provides excellent adherence of the most outer chain to the curved element.

BRIEF DESCRIPTION OF THE DRAWINGS

These and further objects which will be apparent to the expert of the art are attained in accordance with the characterisinq part of the accompanying claims.

The invention will be more apparent from the accompanying drawings, which are provided by way of non-limiting example and on which:

FIG. 1 is a schematic view from above of a conveyor according to the invention, showing a length of chain and a portion of curved element.

FIGS. 2–6 are schematic sections taken on the line 2/2 of FIG. 1 through five variants of a single-track curved element of the invention.

FIGS. 10, 11, 11A, 12, 13, 14, 15 are schematic views of further variants (FIGS. 10 and 12 are views from below as in FIG. 9, FIGS. 11, 11A, 13 are views from below as in FIG. 8, and FIGS. 14 and 15 are sections on the line 14/14 and 15/15 of FIGS. 13 and 12).

FIGS. 18A, 18B, 18C, 18D schematically show respectively an exploded perspective view, a view from below, a section on the line 18C—18C of FIG. 183 and a section on the line 18D—18D of FIG. 18B, of a component for housing the magnets.

FIG. 19 shows a variant thereof.

FIG. 20 is a view from below of the upper part of a single-track curved element for receiving the components of FIGS. 18A–D or FIG. 19.

FIGS. 21A, 21B are schematic cross-sections through a further variant of a curved element, without the return part.

FIGS. 22A, 228 are schematic views from below of two magnet-containing components of the type shown in FIGS. 21A–B.

DETAILED DESCRIPTION OF THE PREFERRED EMBODIMENTS

Figure 7:
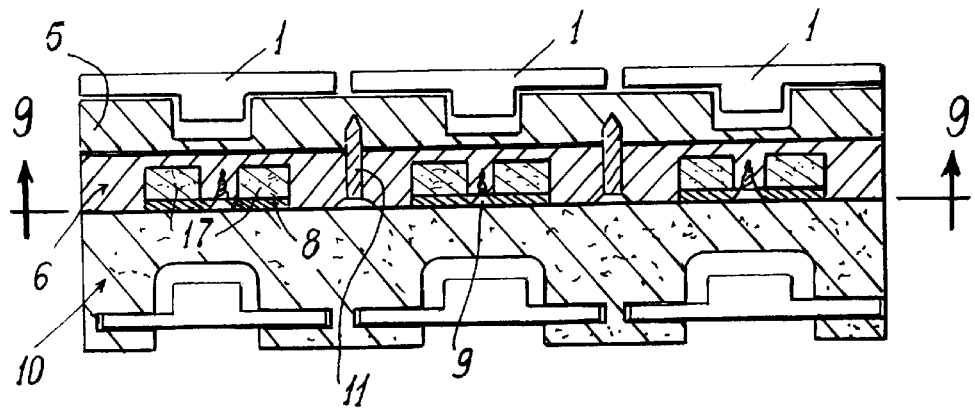
FIG. 7 is a schematic section taken on the line 7/7 of FIG. 9 through a further embodiment of the curved element, but of multi-track type.

With reference to FIGS. 1–6 a conveyor of the invention comprises a chain 1, movable along a guide 2 comprising at least one curved element 3 having two spaced-apart rails 4 along which the chain moves. The curved element 3 comprises two separate overlying parts 5, 6. The upper part 5, formed in one piece, comprises the two rails 4 which are connected together by a thin wall 7 having stiffening ribs B and C (FIGS. 9, 10) uniformly spaced apart.

In the embodiment of FIG. 2, the lower part 6 comprises a plurality of seats, each for housing two permanent magnets 17 of different polarity. These seats are closed by a cover 8. Usual fixing members such as screws 9, 11 can be used to connect together the two parts 5 and 6 and the cover 8. Preferably, the magnet-containing cavities and the seats for the relative screws open into the base wall 6A of the lower part 6 as distant as possible from the chain 1 to prevent creation of interstices in which dirt or bacteria can accumulate along the path of the chain. Preferably, the upper part 5, along which the chain slides, is formed of a material having better wear and abrasion resistance than the magnet-containing part, which can advantageously be formed of a low-cost mouldable plastics material. In particular, the upper part 5 is preferably formed of very high molecular weight polyethylene with a molecular weight greater than or equal to 7.5 million g/molecule. In this respect it has been surprisingly found that by using a polyethylene with a molecular weight equal to or greater than 7.5 million g/molecule, the characteristics obtained are similar to those of elements formed of about 6 million g/molecule molecular weight polyethylene with the addition of ceramic additives. However by using polyethylene without additives but with a higher molecular weight the machining, for example milling, of the elements is easier. In particular, polyethylene of the type marketed under the name "HOSTALEN GUR 4170" manufactured by Hochst could be used. In contrast, to construct the lower part 6 any plastics material can be used having technical characteristics inferior to those of the upper part 5 and hence of lower cost. The cover 8 is preferably formed of a ferromagnetic material which is non-corrosible or is suitably treated in this sense.

With the "sandwich" formed by the two parts 5 and 6 there is generally associated a further part 10, of conventional type, acting as a guide for the return travel of the chain 1. The part 10 is generally formed of a polyethylene comprising regenerated material. The part 10 can be fixed, for example, by a screw 11 which passes through the walls 10A of the part 10 and 6A of the part 6 to engage in the stiffening ribs of the part 5, 15. As the part 10 can also deteriorate under the sliding of the chain, this part by virtue of the structure of the invention can be replaced independently of the upper part 5, which can deteriorate before or after the part 10.

In FIGS. 4, 5, 6 in which the magnet-containing part 6 is represented in simplified form, further possible methods of connecting together the three parts 5, 6, 10 by screws 11 or nuts and bolts 9A are shown. It should be noted that the upper part 5 and lower part 10 can be both advantageously connected to the central part 6 independently of each other, so that they can be replaced separately from each other.

Figure 8:
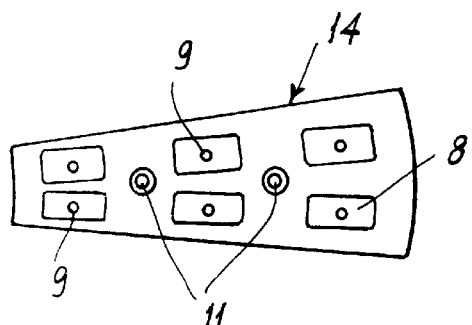
FIG. 8 is a more detailed view from below of a magnet-containing component.
Figure 9:
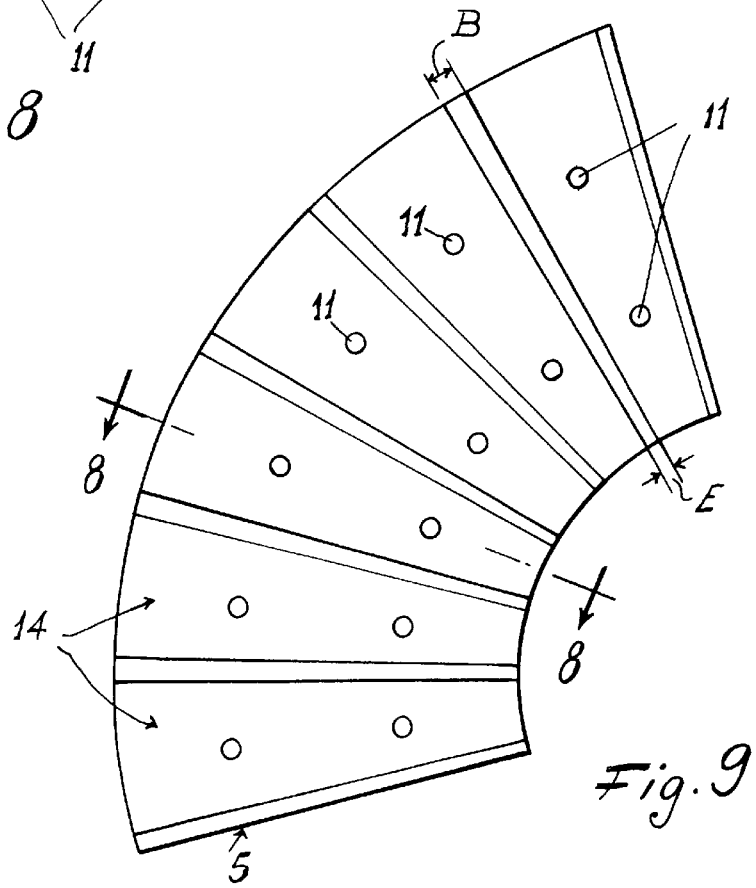
FIG. 9 is a view of the curved element taken from below on the line 9/9 of FIG. 7.

The aforedescribed "sandwich" structure can be used both for single-track curved elements as shown in FIG. 1, and for curved elements with multiple side-by-side tracks, as shown in FIG. 7, in which those parts already described in the preceding figures are indicated by the same reference numerals. It should be noted that the intermediate part 6 which houses the magnets can have the same angular width A (FIG. 1) as the upper part 5 and lower part 10 or, as in FIGS. 8 and 9, it can be composed of a plurality of separate angular parts 14 (FIG. 8) containing two magnets, or associated with the part 1 so as to be uniformly spaced apart by a distance B (FIG. 9). As shown in FIGS. 10–14 the parts 14 could also be of different shape, for example substantially rectangular (FIGS. 11 and 13, 14, 15) and extend either for the entire width of the curved element or only for part of it (FIGS. 12, 13, 14). Advantageously, as shown in FIGS. 11A and 12, the parts 14 can be shaped (FIG. 11A) or positioned (FIG. 12, elements 14 represented by dashed lines) such that more magnets are contained in the larger-radius sections T1 or T2 on the side 15 on which the chains slide, so that on the chains travelling along the rails of greater radius of curvature the acting magnetic force has an intensity substantially equal to that acting on the chains of lesser radius of curvature. It should be noted that the embodiment shown in FIGS. 12, 13, 14, 15 also offers a great advantage when, on having to replace the upper part 5, 15, the magnets have to be removed and remounted on a new part 5, 15.

In this respect, as already stated, pairs of magnets of opposite polarities are generally used to generate the necessary magnetic field. Consequently, in known structures, when the magnets have to be inserted into the slots provided in the upper part 5, it must firstly be checked that the polarity of the magnet to be inserted is correct. In contrast, according to the invention the magnets are inserted in pairs of opposite Polarity into a member 6, 14 for housing them, and by virtue of the provision of a projection 16 (FIG. 13) this pair can be inserted into the relative cavity in the part 5 or 15 only with a determined magnet orientation. In this manner the connection of the magnets to the member 5, 15 is extremely simplified. The chain 1 is of substantially conventional type and comprises a plurality of elements having for example a substantially flat bearing surface 1A (FIG. 2), below which a system is provided for connecting the various elements together The chains can be formed entirely of a ferromagnetic material, or can be constructed of a plastics material with only a part, for example the pin 1D, formed of a ferromagnetic material.

Figure 16:
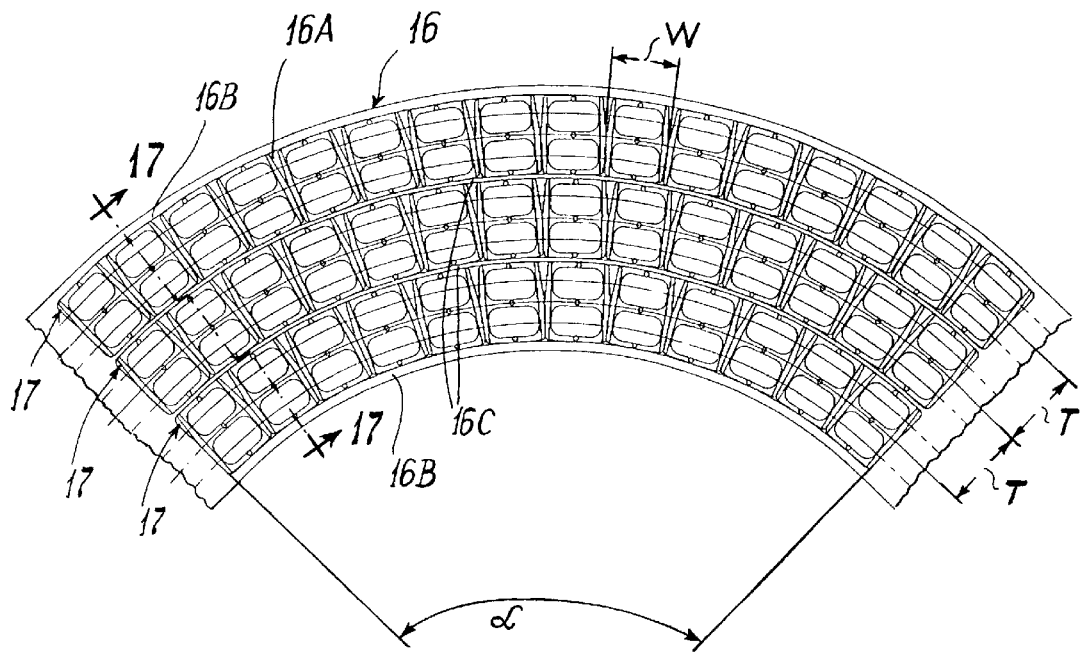
FIG. 16 is a schematic view from below of a further variant of a curved element, without the return part.
Figure 17:
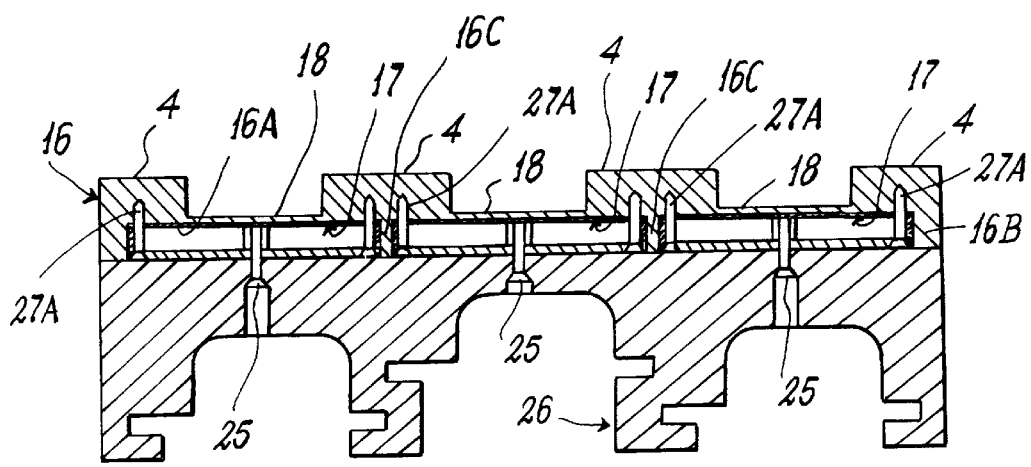
FIG. 17 is a schematic section therethrough on the line 17/17 of FIG. 6 including also the return part.

FIGS. 16–18 show a variant of the embodiment of FIGS. 12–15. This variant shows a three-track curved element in which the base wall 16A (FIG. 16) of the upper part 16 (FIG. 17) comprises three continuous cavities 17 separated from each other by lateral walls 16B and partitions 16C. Each of the cavities 17 extends in width both below the thin wall 18 and below a portion of the rails 4. In each of the cavities 17 there are provided a plurality of magnet-containing parts 19. The parts 19 are dimensioned such that their lower wall is flush with that of the upper part 16 (as shown in FIG. 17). The parts 19, shown in detail in FIGS. 18A–D, comprise a substantially rectangular flat body 20 with two seats 20A, B for two magnets 21A, B, and a lid 22.

The body 20 advantageously has its two longer sides 20C, D slightly curved outwards to facilitate its insertion into the cavity 17 (FIG. 16), and comprises two seats 23 for screws 23A for fixing the cover 22, a central fixing seat 24 for screws 25 (FIG. 17) for fixing a return part 26 for the chain, and lateral seats 27 for the passage of screws 27A (FIG. 17) for fixing the body 20 to the base wall 16A of the upper part 16 of the curved element.

It should be noted that the width W (FIG. 16) of the magnet-containing parts is chosen on the basis of the distance T between one track and the next, of the angle a of the curved element and of the radius Rm1 such that the parts 19 entirely occupy the cavity 17. Thus, in the illustrated example (FIG. 16), using one type of magnet-containing part 19, the cavity 17 of the track of smaller radius Rm1 is "filled" with twelve parts 19, the next one with fourteen and the one of still greater radius with sixteen parts 19.

FIG. 19 shows a magnet-containing part 19A substantially similar to that of FIG. 18 but having straight sides and magnet seats with non-rounded edges.

FIG. 20 shows the upper part 28 of a single-track curved element having in its base wall a continuous single cavity 29 with which the magnet-containing parts 19, 19A can be associated.

FIGS. 21–25 show a further variant enabling the return part (not shown) of a curved element to be fixed to the upper part 30 by screws passing through (FIGS. 21A, B, 22A, B, 23) or between (FIGS. 24 and 25A, B) the magnet-containing parts 31, 32. This embodiment is particularly advantageous when the upper part and return part are spaced apart, for example when they are separated by a transverse bar of the conveyor structure.

Figure 21B:
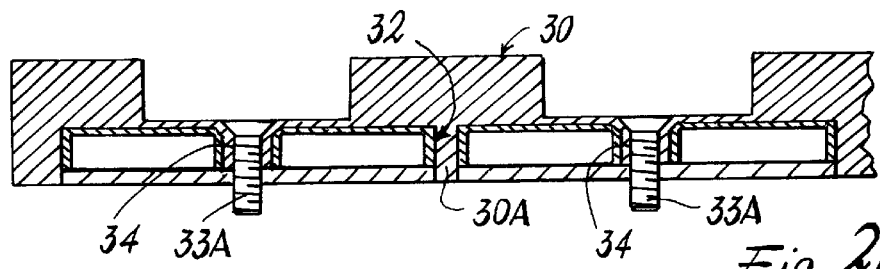

FIGS. 21A and 21B show respectively the upper part 30 and the relative magnet-containing parts 31 in the case of curved elements comprising one or more tracks.

The upper part 30 comprises for each track a continuous cavity which in the multi-track embodiment is separated by a wall 30A and which, at the holes for passage of the fixing screws 33A for the return part, comprises holed projections 34 projecting into said cavities and arranged to penetrate into or between the magnet-containing parts 31.

Figures 22A, 22B:
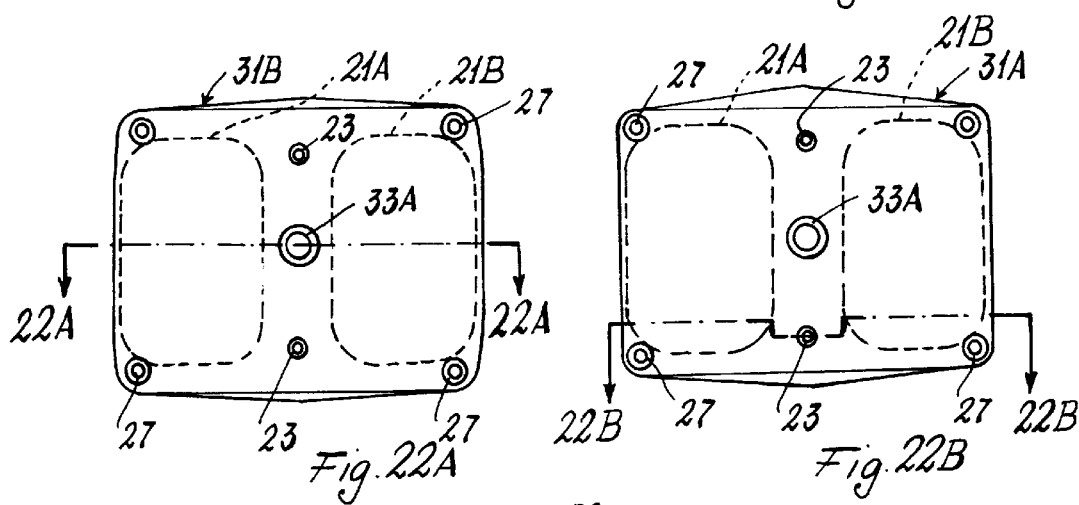
Figure 23:
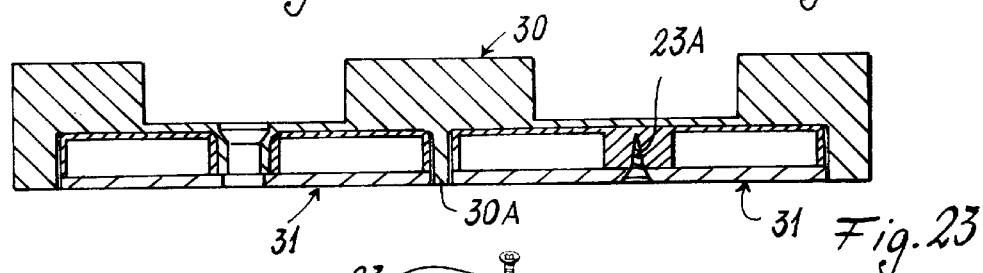
FIG. 23 is a schematic cross-section through the curved element of FIG. 21B in which the magnet-containing components are shown as sections on the lines 22A—22A and 22B—22B of FIGS. 22A and 22B.

FIGS. 22A, 22B show two magnet-containing parts 31A, B of slightly different shape one to the other but similar to the part 19 of FIG. 18A, they having a central hole 33A for inserting the projections 34 (the parts common to the embodiment of FIG. 18A are indicated by the same reference numerals and will therefore not be further described).

Figure 24:
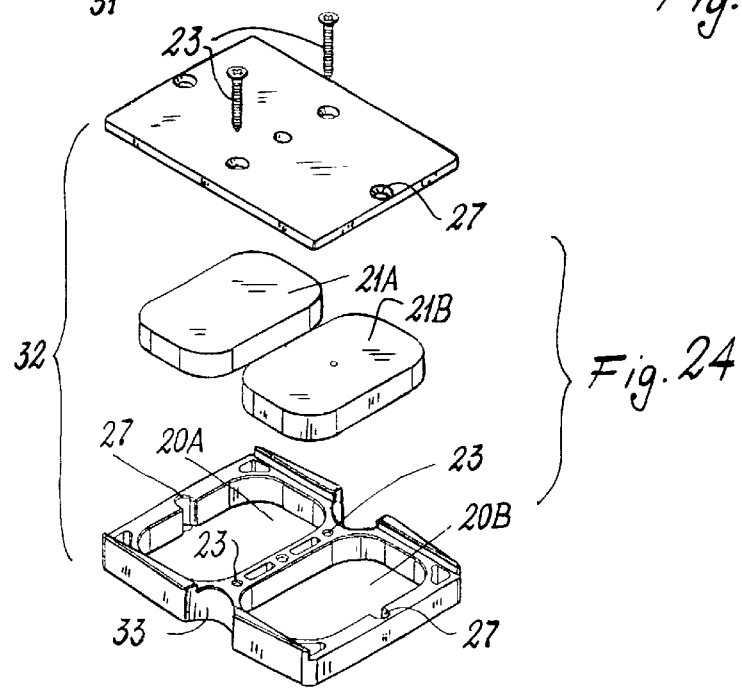
FIG. 24 is a schematic exploded perspective view of a further variant of a magnet-containing component.
Figures 25A, 25B:
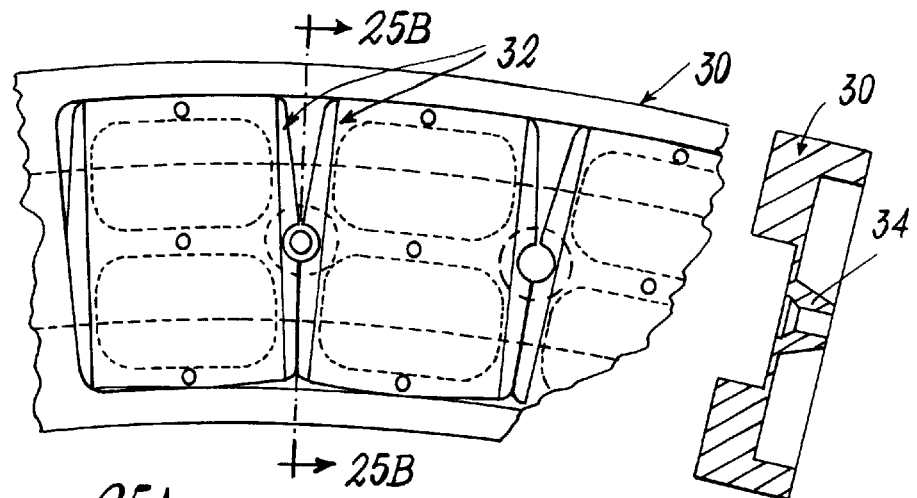
FIGS. 25A and 25B are a schematic view from below and a schematic section on the line 25B—25B of FIG. 25A of the component of FIG. 24 associated with the upper part of a curved element.
Figures 26A, 26B:
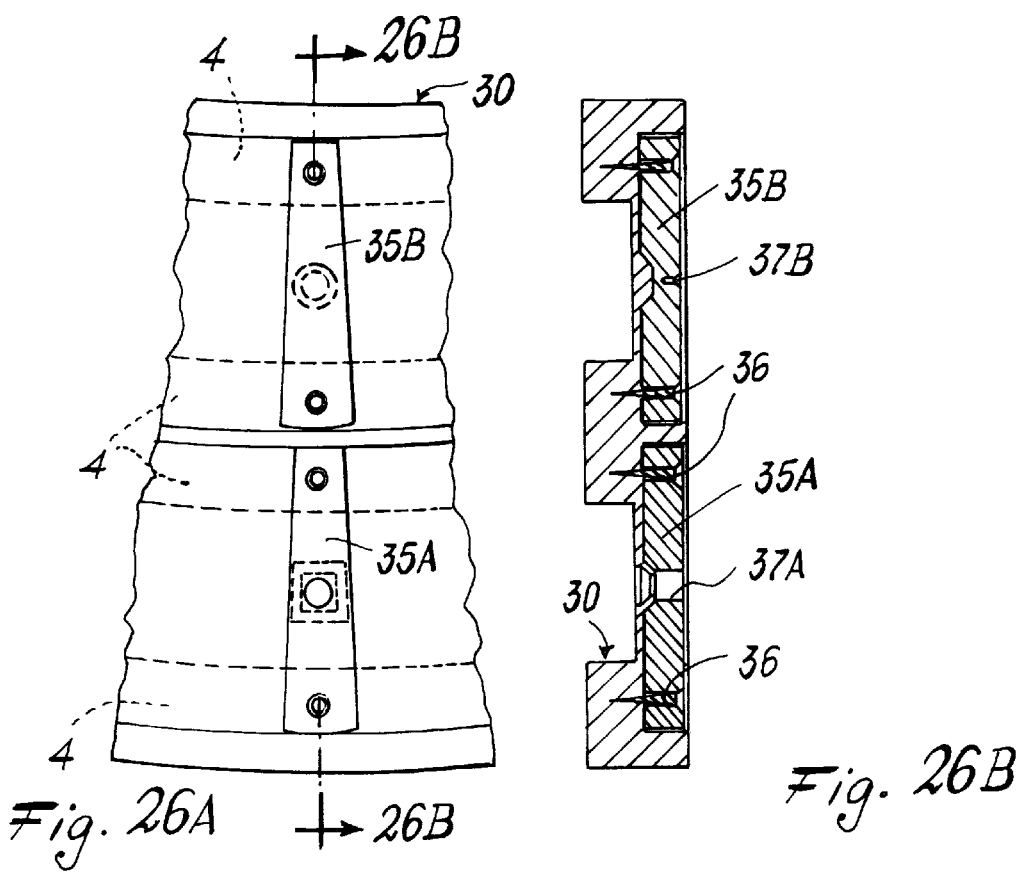
FIGS. 26A and 26B are respectively a view from below and a section on the line 26B—26B of FIG. 26A, of an upper part of a curved element and two different further additional components.

FIGS. 24, 25A, B show an embodiment similar to the preceding but in which the screws for joining the upper and lower parts together pass between one magnet-containing part 312 and the other.

For this purpose, in its longer sides the magnet-containing part comprises semicircular recesses 33 for the passage of screws for fixing the return part (the other characteristics common to the magnet-containing part 19 already described with reference to FIG. 18A are indicated by the reference numerals used in this latter figure and will not be further described).

It should be noted that the screws for fixing the upper and lower parts together can be of the cylindrical type to cooperate with a nut or of the threaded type to be screwed directly into the plastics material of the parts to be joined together.

As the holes for passage of the screws fixing the upper and lower parts together can be angularly spaced apart in any manner, at the choice of the parts manufacturers, a bridge element 35A, B can be used to enable the lower part to be connected. For this purpose the bridge elements can be of the type (35A) having a through hole 37A coaxial to that of the first piece 30, or of the type (35B) having a non-through hole 378 coaxial to that of the first piece to enable the return piece to be connected to the first piece.

The bridge elements 35A, B are connected in conventional manner to the upper part 30 by screws 36. The magnet-containing parts, for example of the type shown in FIGS. 18A, 19, 24, can be fixed to the base of the upper part to the right or left of the bridge elements 35A and B.

It should be noted that for all the aforedescribed variants involving multi-track curved elements, the number of magnets increases as the track radius increases (as shown in FIG. 16). However not all the magnets are necessary for proper operation of the curve, hence to reduce costs, magnet-containing parts without magnets can be associated with the upper part. These empty magnet-containing parts can be identified by a particular colour or mounted inverted, ie with that part associated with the wall 22 (FIG. 18A) in contact with the base of the upper part of the curve.

The aforedescribed magnet-containing parts can be produced by moulding, either as individual parts or joined together in such a manner as to be easily separated (for example the parts being joined together by a small arm which can be easily cut).

It should be noted that the aforedescribed embodiments are provided by way of non-limiting example and numerous modifications are possible all falling within the same inventive concept.

Finally, it is to be noted that all the aforedescribed curved elements and, in particular, their first pieces with rails on which a chain moves, and their second pieces for supporting the chain during its return travel are, advantageously, dimensioned in such a way that they may be used also for existing conveyors or, in other words, that their pieces have standard dimension.

What is claimed is:

1. A curved element for a magnetic conveyor comprising at least >he conveyor chain (1) movable along a guide (2) comprising at least one curved portion, said curved element having a structure (5, 6; 15, 14; 16, 19; 19A; 28; 30, 31; 32) comprising at least two spaced-apart parallel rails (4) on which the chain (1) moves, magnets (17, 21A, 21B) arranged to attract the chain against the rails (4), and a lower part (10, 26) for supporting the chain during its return travel, characterised in that said structure comprises at least one first piece (5, 15, 16, 28, 30) on which the chain (1) moves and comprising said rails (4), a second piece (10, 26) comprising said lower part, and at least one third piece (6, 14, 19, 19A, 31, 31A, 31B, 32) for housing the magnets (17, 21A, 21B), said third piece being separate from the first and from the second piece and being removably connected to at least one of said pieces by connection means (9A, 11, 27A).

2. An element as claimed in claim 1, characterised in that the structure is formed from only three parts, namely the first piece (5, 15, 16, 28, 30), the second piece (10, 26) and the third piece (6, 14, 19, 19A, 31, 31A, 31B, 32).

3. An element as claimed in claim 1, characterised in that the first piece (5, 15, 16, 28, 30), the second piece (10, 26) and the third piece (6, 14, 19, 19A, 31, 31A, 31B, 32) are mutually superposed to form a multi-layer structure, with the third piece positioned between the first two.

4. An element as claimed in claim 1, characterised in that the first piece (5, 15, 16, 28, 30), the second piece (10, 26) and the third piece (6, 14, 19, 19A, 31, 31A, 313, 32) are constructed of different plastics materials.

5. An element as claimed in claim 4, characterised in that the third piece (6, 14, 19, 19A, 31, 31A, 31B, 32) is constructed by moulding a low-cost plastics materials.

6. An element as claimed in claim 4, characterised in that the first piece (5, 15, 16, 28, 30) is constructed of a polyethylene with a molecular weight greater than or equal to 7.5 million/molecule.

7. An element as claimed in claim 1, characterised in that the third piece (6, 14, 19, 19A, 31, 31A, 31B, 32) is shaped and connected to the first piece (5, 15) in such a manner that the magnets (17, 21A, 21B) contained in it are at least partly positioned between the two rails (4) on which the chain (1) moves.

8. An element as claimed in claim 1, characterised in that the first piece (15, 16, 30) comprises a plurality of pairs of rails (4) to enable a plurality of side-by-side chains (1) to slide thereon, the number of magnets (17, 21A, 21B) present along each pair of rails being able to be varied and increased as the radius of said pairs of rails increases.

9. An element as claimed in claim 1, characterised in that the third pieces (14) are shaped to be able to house a number of magnets (17) which can be varied and increased as the radius of the first piece (15) with which said second piece is associated increases.

10. An element as claimed in claim 1, characterised in that the third piece (6, 14, 19, 19A, 31, 31A, 31B, 32) comprises at least one seat (20A, 20B) for housing a magnet (17, 21A, 21B), and a cover (8, 22) for closing said seat.

11. An element as claimed in claim 10, characterised in that the closure cover (8, 22) is formed of non-corrosible ferromagnetic material.

12. An element as claimed in claim 1, characterised in that the first piece (5, 15, 16, 28, 30) and the second piece (10, 26) are connected to the third piece (6, 14, 19, 19A, 31, 31A, 31B, 32) by separate connection means (25, 27A).

13. An element as claimed in claim 1, characterised in that the third piece (6, 14, 19, 19A, 31, 31A, 31B, 32) comprises at least one pair of magnets (17, 21A, 21B) of opposite polarities.

14. An element as claimed in claim 13, characterised in that the third piece (6, 14) and the first piece (5, 15) or second piece (10) are shaped in such a manner as to be able to be associated with each other only if the pair of magnets are orientated in a precise manner.

15. An element as claimed in claim 1, characterised in that the first piece (16, 28, 30) comprises, in correspondence with its base wall, a continuous recessed seat (17) extending in width below at least a portion of the rails (4) on which the chain moves, in said continuous recessed seat there being provided a plurality of third pieces (19, 19A. 31, 31A, 31B, 32) housing the magnets (21A, B), said third pieces and magnets being shaped such that at least a portion of the magnets is positioned in correspondence with said rails.

16. An element as claimed in claim 15, characterised in that the third pieces (19, 19A, 31, 31A, 31B, 32) are shaped such that their lower wall is flush with the lower wall of the first piece (16, 28, 30).

17. An element as claimed in claim 15, characterised in that the first piece (16, 30) comprises a plurality of pairs of rails (4) to enable a plurality of side-by-side chains (1) to slide thereon, in correspondence with each pair of rails there being provided a continuous recessed seat (17), said seats being of equal width and being separated from each other by a thin wall (16C).

18. An element as claimed in claim 15, characterised in that the third pieces (19, 31, 31A, 31B, 32) are of substantially rectangular shape, their longer sides (20C, D) having a slight outward curvature.

19. An element as claimed in claim 15, characterised in that the third pieces (19, 19A, 31, 31A, 31!B, 32) have a plurality of separate cavities (23. 27, 24) arranged to cooperate with means (23A, 33, 27A) for fixing said third piece to the first piece (16, 18) and to the second piece (26), and a closure wall (22) for the third piece.

20. An element as claimed in claim 15, characterised in that the third pieces (32) comprise in their outer edges a plurality of recessed parts (33) to allow passage of means for connecting the first piece (30) to the second piece.

21. An element as claimed in claim 15, characterised in that the first piece (30) comprises between the rails (4) a plurality of through holes for the insertion of fixing means (33) for said first piece, the recessed seat (17) comprising, in correspondence with said holes, holed projections (34) coaxial with said holes and extending into the seat, the third pieces (31, 31A, 31B, 32) comprising apertures (33A) or recesses (33) for the at least Partial penetration of said holed projections (34) into said third pieces.

22. An element as claimed in claim 15, characterised in that the first piece (30) comprises between the rails (4) a plurality of through holes for the insertion of means for fixing said first piece to the second piece, bridge elements (35A. B) being provided to be housed transversely in the recessed seat, said bridge elements comprising, coaxially to said through holes, apertures (37A, B) allowing passage or insertion of fixing means for the second piece, means (36) being provided for fixing said bridge elements to the first piece (30).

23. A magnetic conveyor comprising at least one conveyor chain (1) movable along a guide (2) comprising at least one curved element having a structure (5, 6; 15, 14; 16, 19; 19A; 28; 30, 31; 32) comprising at least two spaced-apart parallel rails (4) on which the chain (1) moves, magnets (17, 21A, 21B) arranged to attract the chain against the rails (4) and a lower part (10, 26) for supporting the chain during its return travel, characterised in that the curved element conforms to that claimed in the characterising part of one of claim 1.

* * * * *

UNITED STATES PATENT AND TRADEMARK OFFICE
CERTIFICATE OF CORRECTION

PATENT NO. : 6,129,201

DATED : October 10, 2000

INVENTOR(S) : Langhans, Gerhard

It is certified that error appears in the above-identified patent and that said Letters Patent is hereby corrected as shown below:

On the Title Page, Item [73] Assignee, delete "Technopolimeri" and insert ------ Tecnopolimeri -----.

Signed and Sealed this

Twenty-ninth Day of May, 2001

Attest:

NICHOLAS P. GODICI

*Attesting Officer*    *Acting Director of the United States Patent and Trademark Office*